Dec. 2, 1969          R. M. ZOOT          3,481,672
F.M. LASER CONTOUR MAPPER

Filed Jan. 3, 1967          4 Sheets-Sheet 1

Robert M. Zoot,
INVENTOR.
BY.

ATTORNEY.

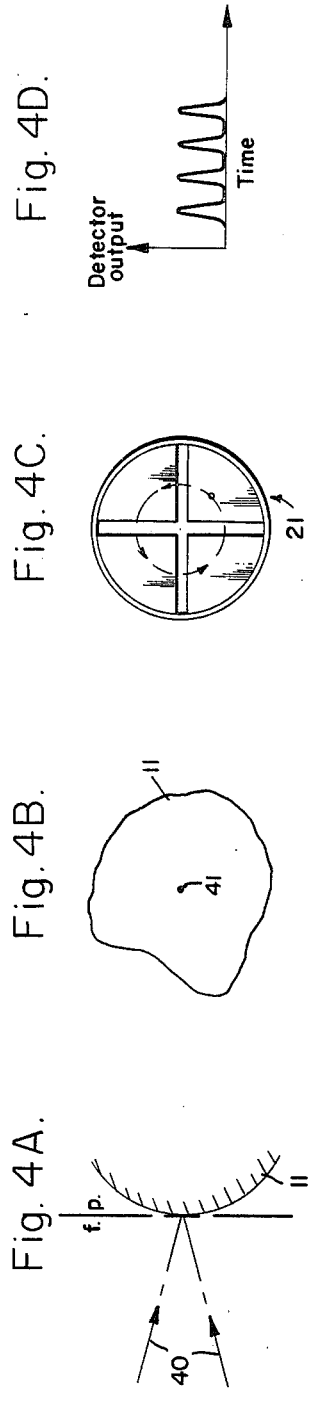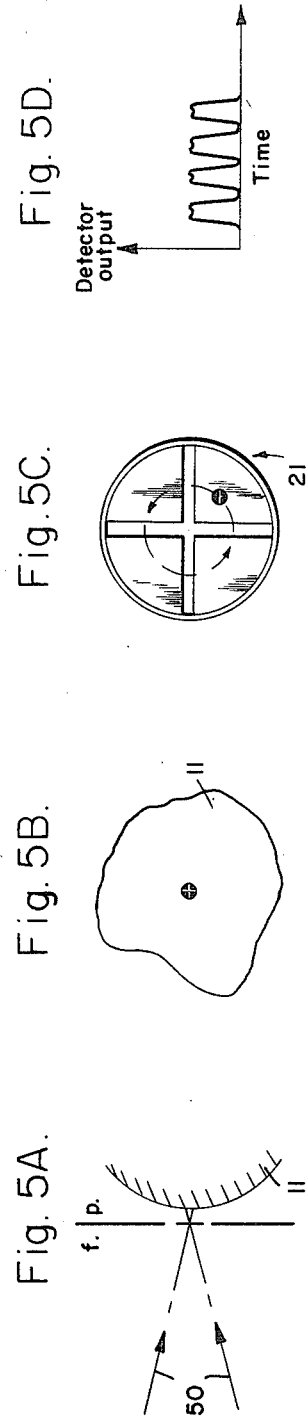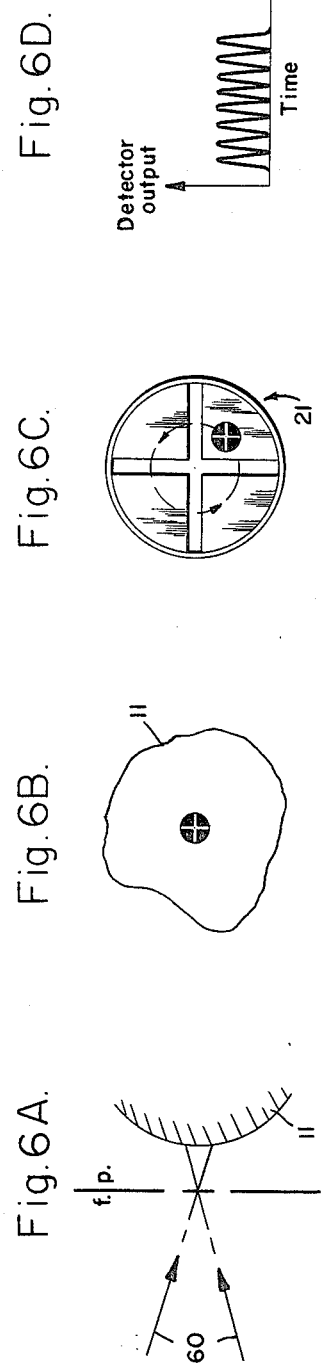

United States Patent Office 3,481,672
Patented Dec. 2, 1969

3,481,672
F.M. LASER CONTOUR MAPPER
Robert M. Zoot, Thousand Oaks, Calif., assignor to Hughes Aircraft Company, Culver City, Calif., a corporation of Delaware
Filed Jan. 3, 1967, Ser. No. 616,996
Int. Cl. G01b 11/00; G01c 3/08
U.S. Cl. 356—167                8 Claims

ABSTRACT OF THE DISCLOSURE

A non-contacting distance gauge and contour mapping apparatus utilizing a high intensity light source. A single light beam from the source is split into a plurality of separate beams by an appropriate transmitter reticle structure. The beams are then focused on the object, the distance to which, or contours of which, are being measured. At object-focal point coincidence, the beams merge to form a single spot. When the object surface does not coincide with the focal point, multiple spots are produced. Light reflected from the object is caused to sweep across a receiving reticle placed in front of an optical detector. The harmonic content of the optical detector output is indicative of the object focal plane coincidence. A servomechanism used in conjunction with drive mechanisms serve to keep the beams focused on the object no matter how its contour changes. Readout information is obtained from the in-out motion of the transmitter.

---

This invention relates to electro-optic measuring methods and apparatus and more specifically to methods and apparatus for quickly and accurately determining distances and contours.

In the past, countless methods and devices have been employed to measure relatively short distances. Depending upon the particular requirement of the job at hand, direct measurements have been made with rulers, calipers, micrometers and gauges of innumerable types. Frequently, it is advantageous or necessary to measure the distance between a reference point and an object without touching or disturbing the object. The requirement for noncontacting measurement may arise because of the nature of the object or because of its position. Oftentimes, in such instances, optical techniques, including those which utilize precision instruments and associated hardware, have been employed. In general, such techniques require highly skilled operators to perform manual adjustments and set-up operations. Depending upon the application, these operations can comprise positioning aligning, leveling and establishing reference targets. It is obvious, therefore, that such measuring techniques are both complex and time-consuming.

Accordingly, it is one object of the present invention to simplify optical measuring techniques.

It is another object of the present invention to provide improved noncontacting apparatus for accurately measuring the distance between a reference point and an object.

One application of precision measurements in modern industry is in conjunction with automatic machining and tooling processes. In these applications, it is frequently advantageous to construct a model of an article of manufacture or structure from which patterns, dies or drawings can be made. It is common practice in these processes to utilize a master model or template, together with automatic machine tools, to form large quantities of similarly finished articles.

In manufacturing or construction practices which utilize this technique the contours of the model must be translated into a form by which the mass-produced articles may be manufactured. This process may involve time-consuming hand measurements or the construction of templates at successive cross-sections of the object. It is therefore advantageous to utilize contour or profile mapping means which enable the contours of the object to be determined quickly, precisely and preferably automatically. It is also advantageous if the contour mapper is capable of yielding an output in the form of digital or analog signals which can be utilized to program automatic machine tools for die forming or machining operations.

Recently, and as a consequence of advances in laser technology, automatic contour mapping systems have been proposed which offer greater accuracy than heretofore available. Two such systems are mentioned briefly in an article appearing in Electronics, vol. 39, No. 17, dated August 22, 1966, at pages 209–210. According to this article, both systems are based on the fundamental concept of keeping a laser beam continuously focused on the model or object being measured, no matter how its contour changes. That is, as the optical system is moved laterally across the model the laser head is moved toward and away from the object, thereby maintaining the distance constant. Readout information representative of the in-and-out motion of the laser head thereby furnishes an accurate measure of the variation of contours of the model. This readout information can then be processed and stored on tape or cards for later utilization or can be fed as input information to automatic machine tools. It is apparent that the dimensional readout information can be scaled up or down in any desired manner by electronic or mechanical means.

Although the two above-mentioned systems share a common principle of operation, they differ in the manner in which this principle is implemented. Specifically, although both use a laser beam which is focused on the model, one system utilizes a triangulation method to maintain the laser beam in focus. That is, a continuous wave laser is used in one leg of a triangle and an optical detector in another leg. The distance separating the laser and detector forms the third leg of the triangle. By virtue of this arrangement, the greatest accuracy is achieved only for contour changes in the direction normal to the plane of the triangle.

The second system utilizes a laser beam focused on the object by means of a lens arrangement which is also used for receiving the reflected image. By virtue of the coaxial laser transmitter and receiver optics a much greater range of contours can be measured. In keeping with this system, the image of the beam reflected from the object is projected onto an optical detector. A small pin hole interposed in the light path between the object and the detector at the focal point, or point of least confusion, is caused to oscillate by means of a tuning fork, thereby modulating the intensity of the detected image. A lock-in detector coupled to both the tuning fork oscillator and the optical detector provides a measure of the distance between the laser transmitter and the object.

It is a further object of the present invention to provide an electro-optic contour mapping system operating on the principle of frequency modulation.

In keeping with the principles of the present invention, the above-mentioned objects are accomplished with a beam of high intensity monochromatic light such as that provided by a continuous wave laser. The light beam is transmitted through a beam splitting reticle in the transmitting optical system. When the beam is focused on the object, the distance to which is to be determined, an image in the form of a single spot is produced. As the distance between the light source and object increases or decreases so that the image is out of focus, the image produced on the object separates into a plurality of spots. By utilizing a receiving optical system which includes a rotating nutating plate and a receiving reticle in front of an optical detector, a fluctuating detector output signal is obtained. The harmonic content of the detector output signal provides a measure of the amount by which the object surface is out of focus.

By employing three-axis mechanical drive means for the laser transmitter-optical detector assembly, noncontacting contour mapping is achieved. The harmonic components of the detector output can be passed through a tuned high Q filter, for example, to provide an error signal to a servomechanism for automatic tracking. As the beam is scanned across the object, the in-out motion of the servo drive mechanism provides a direct measure of object contour changes.

In order that the invention may be clearly understood and readily carried into effect, it will now be described with reference by way of example to the accompanying drawings, in which:

FIGS. 4A, 4B, 4C and 4D are sequence views illustrating the operation of the embodiment of FIG. 1 for an object having a surface which is coincident with the focal plane of the transmitting optical system.

FIGS. 5A, 5B, 5C and 5D are sequence views illustrating the operation of the embodiment of FIG . 1 for an object having a surface which is slightly displaced from the focal plane of the transmitting optical system.

FIGS. 6A, 6B, 6C and 6D are sequence views illustrating the operation of the embodiment of FIG. 1 for an object having a surface which is substantially displaced from the focal plane of the transmitting optical system.

Figure 1:
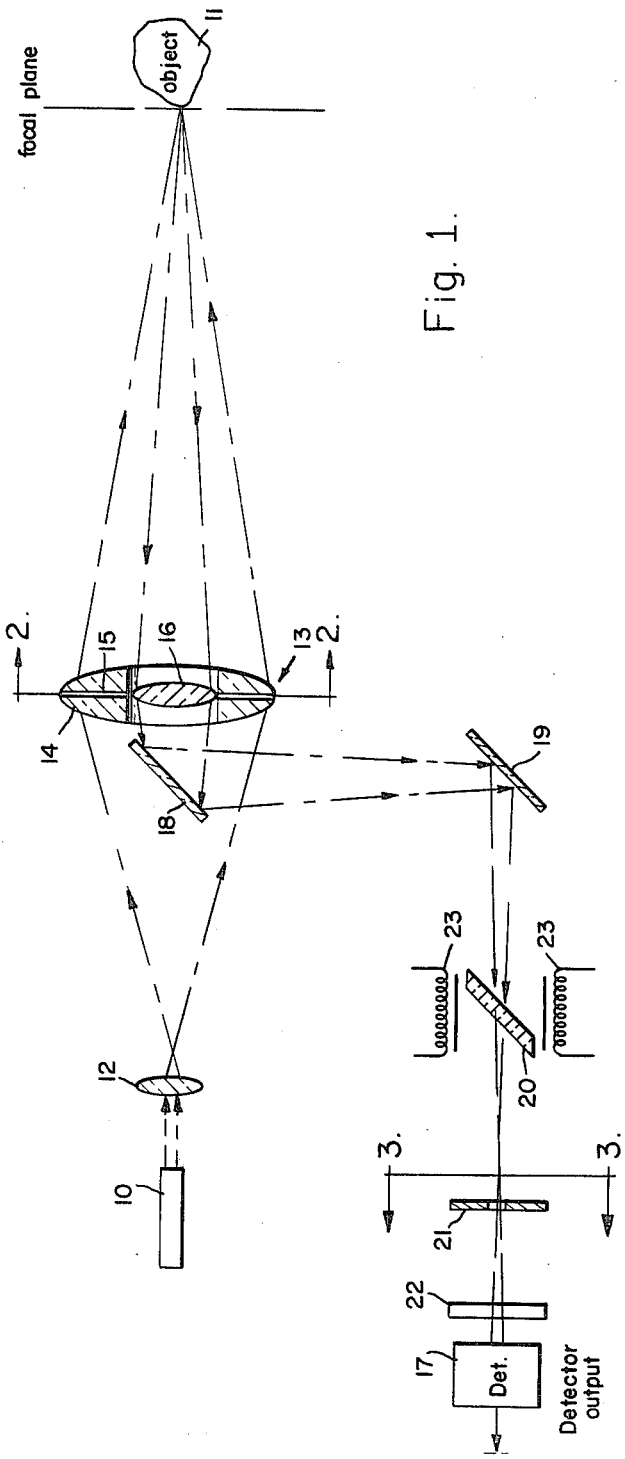
FIG. 1 is a view, partially in schematic and partially in cross-section, of a preferred embodiment of the present invention.

Referring more specifically to the drawings, FIG. 1 is a view, partially in schematic and partially in cross-section of a preferred embodiment of the present invention. In FIG. 1 there is shown a light source 10 which is capable of emitting a continuous beam of high-intensity, highly-directional, substantially monochromatic light. As used herein, the term "light" is understood to include not only those portions of the electromagnetic wave spectrum lying in the visible region but also those in the infrared and ultraviolet regions. By way of example, light source 10 can comprise a laser oscillator of the continuous wave type.

An object 11, the distance to which is to be measured, is located away from light source 10. In the optical path between light source 10 and object 11 there is disposed a primary lens 12 and a composite lens-reticle structure 13. The composite lens-reticle structure 13, in turn, comprises an annular transmitting objective lens 14, an annular transmitting reticle 15 and a receiving objective lens 16, which is located within the central region of annular transmitting lens 14. Although transmitting reticle 15 is shown as a thin centrally located member sandwiched between two halves of the transmitting objective lens, other arrangements are possible. For example, if a more economical structure is desired, the reticle can simply be painted upon one of the surfaces of the transmitting objective lens 14.

An optical detector 17, which is capable of generating an electrical output signal, the magnitude of which varies in response to the intensity of the light incident upon it, is also incorporated in the embodiment of FIG. 1. In the optical path between object 11 and detector 17 is the receiving objective lens 16, reflecting members 18 and 19, a nutating plate 20, a receiving reticle 21 and an optical filter 22.

In operation, a high-intensity light beam provided by light source 10 is directed through primary lens 12. The light beam, indicated by the dashed arrows, diverges after passing through lens 12 and is directed toward composite lens-reticle structure 13. The central portion of the diverging light beam is intercepted by the back of reflector 18. The annular outer portion of the diverging light beam passes through transmitting objective lens 14 and is split into four somewhat pie-shaped segments by transmitting reticle 15 and focused on object 11. It is noted that reflecting member 18 is preferably of substantially elliptical shape so that when it is oriented at an angle as shown in FIG. 1, it presents a circular cross-section to the light beam source 10. In this manner, receiving objective lens 16 is masked from the transmitted light beam. In practice, the back of reflecting member 18 can be absorptive or reflective of the light beam from source 10 so long as it is nontransmissive. This is important in order to insure that the light pattern formed on object 11 is entirely due to the light beam passing through the transmitting objective lens 14 and is not distorted, blurred or "fogged" by other light reaching the object which does not pass through the transmitting reticle 15.

As mentioned above, the transmitted light is split by transmitting reticle 15 into four segments and focused on object 11. In the embodiment of FIG. 1, the region of object 11 on which the transmitted light beam is focused coincides with the focal point of the primary lens-transmitting objective lens combination. When object 11 is so situated, the transmitted light beam appears as a spot on the surface of object 11. The diameter of the spot is extremely small and is determined primarily by the quality of the optical path including lens 12 and 14.

Reflected light from the spot imaged on object 11 passes through the receiving objective lens 16 which causes the beam to converge. The converging beam is reflected by reflecting members 18 and 19 and directed through nutating plate 20. In passing through nutating plate 20, the converging light beam is displaced from the optical axis. By rotating nutating plate 20 by means of a motor assembly, indicated generally by windings 23, the converging light beam can be made to trace a circular path. The rotating nutated light beam is then directed toward receiving reticle 21. By virtue of the geometric configuration of receiving reticle 21, the converging light beam is periodically interrupted so that it passes through optical filter 22 to detector 17 only four times per revolution of nutating plate 20. Optical filter 22 serves to pass only those wavelengths near the operating wavelength of light source 10, thereby reducing the "noise" to detector 17.

Figure 2:
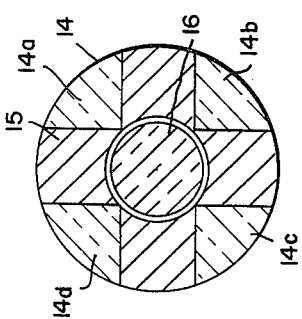
FIG. 2 is a cross-sectional view of the composite lens-reticle structure utilized in the embodiment of FIG. 1.

In order to more fully understand the operation of the embodiment of FIG. 1, reference is made to the cross-sectional view of FIG. 2 which is taken through the center of composite lens-reticle structure 13. In FIG. 2, transmitting reticle 15 is indicated as a cross which masks most of transmitting objective lens 14 with the exception of the four substantially pie-shaped sections indicated as 14a, 14b, 14c and 14d. The receiving objective lens 16 as indicated hereinabove is disposed coaxially within the center of the transmitting objective lens and is held in place by suitable mounting or bonding means well known in the art. Although the composite lens-reticle structure is indicated as comprising two separate lenses, it is obvious that one single lens can be used, together with an appropriate reticle which leaves a circular opening in the central region to form the receiving objective lens.

Figure 3:
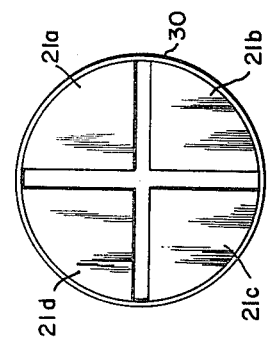
FIG. 3 is a plan view of the receiving reticle structure utilized in the embodiment of FIG. 1.

FIG. 3 is an illustration of receiving reticle 21 viewed from the direction of the optical axis indicated by arrows 3—3. Receiving reticle 21 comprises four opaque quadrants 21a, 21b, 21c and 21d which are held in place by a suitable mounting ring 30. Between the quadrants there is a transparent dielectric gap or air space in the form of a cross. Receiving reticle 21, therefore, has a geometric configuration which can be described as the inverse of the configuration of transmitting reticle 15. That is, the transparent region of the receiving reticle forms a cross, whereas in the transmitting reticle, the opaque region forms a cross.

Continuing the description of the operation of the embodiment of FIG. 1, reference is now made to FIGS. 4, 5, and 6 which represent the conditions of the embodiment of FIG. 1, wherein the illuminated region of object 11 is coincident with the focal plane, slightly out of the focal plane, and substantially out of the focal plane, respectively. Specifically, FIG. 4A is an enlarged view of the object 11, showing the converging transmitted light, indicated by arrows 40, illuminating a region of object 11 which lies in the focal plane. The image thus produced is shown in the partial view of object 11 shown in FIG. 4B. Under the condition of object-focal plane coincidence, the image formed is a highly illuminated point of light 41.

The reflected light from the illuminated point 41 is transmitted back through the receiving objective lens 16 as explained hereinabove. The reflected image is thereafter nutated in a circular path around the axis of receiving reticle 21 as indicated in FIG. 4C. The speed of rotation of the nutated reflected image is, of course, determined by the rotational speed of nutating plate 20. In each traversal of its circular path around receiving reticle 21, the reflected image passes through the open portions thereof and reaches detector 17. By virtue of the geometric configuration of receiving reticle 21, the reflected light beam passes therethrough four times during each revolution. Thus, the detector output signal shown graphically in FIG. 4 consists of a series of pulses having a frequency equal to four times the nutating frequency.

FIGS. 5A, 5B, 5C and 5D illustrate the same sequence as described above but for the case in which the object 11 is slightly behind the focal plane. As seen from FIGS. 5A and 5B, the image produced on the object is larger and consists of four quadrants of light produced by the masking effect of the transmitting reticle. After the received image is nutated about the receiving reticle 21 shown in FIG. 5C, it is transmitted to the detector. The detector output illustrated in FIG. 5D comprises a broadened waveform with a slight second harmonic component. The harmonic content of the detector output is increased further as the object 11 moves further from the focal plane. The sequence views of FIGS. 6A, 6B, 6C and 6D illustrate the condition for an object substantially out of the focal plane of the transmitting lens. As indicated in FIG. 6D, the detector output signal is substantially a total second harmonic signal.

It is apparent that the detector output can be utilized to determine the condition wherein the object is in the focal plane of the transmitting lens. This is done by moving either the object or the optical structure, hereinafter termed the "sensing head," so as to minimize the harmonic content of the detector output. As will be described hereinbelow, this can be accomplished by means of a servomechanism in which an error signal derived from the hormonic content of the detector output serves as a control signal which adjusts the object-transmitter distance to the point of minimum detector harmonic content. A reference point can be established for the sensing head-to-object distance which results in object-focal plane coincidence. With a reference position thus established, a micrometer dial or linear displacement transducer coupled to the drive mechanism can be utilized to indicate the distance between the reference point and object.

Figure 7:
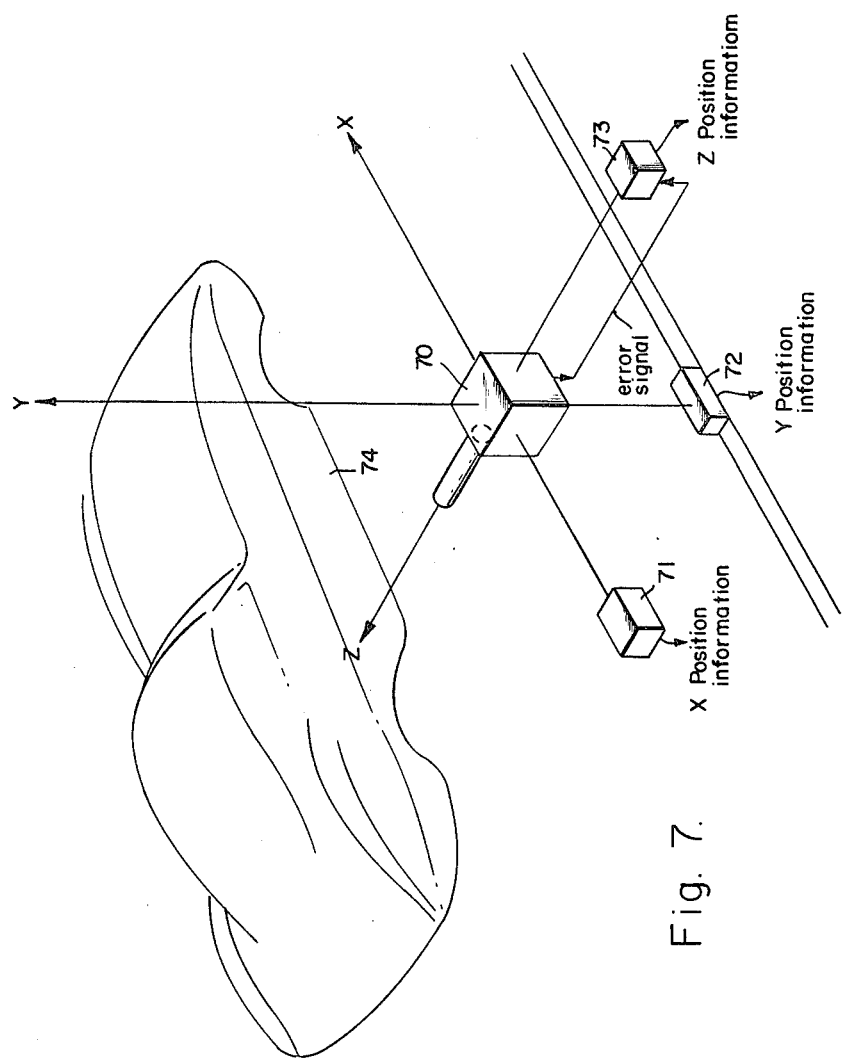
FIG. 7 is a simplified pictorial view of an embodiment of the present invention adapted for automatic contour mapping use.

In FIG. 7 there is shown a simiplified block diagram view illustrating a preferred use of the present invention. In FIG. 7, the sensing head which comprises the elements shown in FIG. 1 is indicated generally by block 70.

The sensing head 70 is adapted by mechanical means such as a gantry for selective and controlled three-dimensional motion. Drive mechanism indicated by blocks 71, 72 and 73 provide the power means for moving the optical system in the $x$, $y$ and $z$ directions respectively. In accordance with the arbitrarily assigned nomenclature of FIG. 7, the $x$ and $y$ axes correspond to the horizontal and vertical directions respectively, and the $z$ axis corresponds to the direction perpendicular to the $x$–$y$ plane toward the object 74.

In FIG. 7, object 74 is shown as comprising a model of an automobile body, the contour of which is to be measured. It is obvious, of course, that other models such as buildings, airframes, or other objects or works of art of substantially limitless scope may be adapted for contour mapping by this method.

For the sake of clarity, the mechanical details of the $x$–$y$–$z$ drive mechanisms have eben omitted from the embodiment of FIG. 7. Numerous suitable $x$–$y$ plotters or gantries are known in the art. Mechanical $x$–$y$ plotters can comprise, for example, a set of horizontal load-bearing tracks which supports a framework, which in turn supports the drive motors, drive screws, and linear displacement transducers. Control voltages to the drive motors can be programmed to cause the optical system 70 to scan the $x$–$y$ plane much as an electron beam scans the target of a cathode ray tube in a television receiver. In some instances, the scan can be performed in incremental steps of a small fraction of an inch, depending upon the desired accuracy. If desired, the drive motors can also be programmed to scan continuously. In either event, the linear displacement transducers integral to each of the drive mechanisms provide the output which is indicative of the position of the sensing head along the $x$ and $y$ axes.

For each $x$–$y$ position at which contour or $z$ information is desired, the optical system, together with the $z$ axis drive motor 73 which is coupled thereto by means of a servo loop, is caused to seek object-focal plane coincidence. When this point of coincidence is reached, the $z$ displacement information from a third linear displacement transducer coupled to the $z$ axis drive mechanism is read. Since the focal length of the sensing head is known and remains fixed, the $z$ distance to the object for any $x$–$y$ position can be readily computed and recorded.

Figure 8:
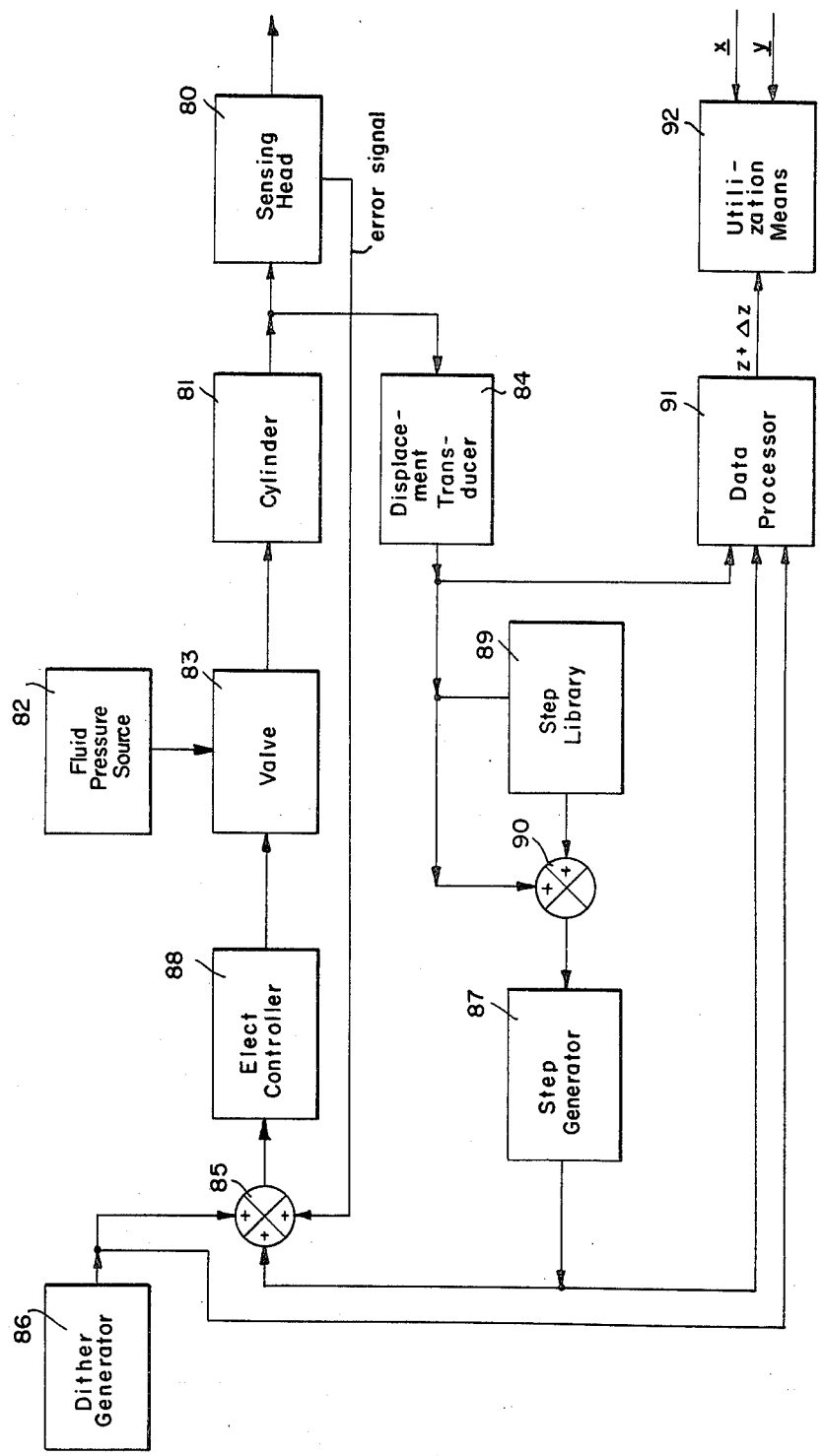
FIG. 8 is a block diagram of a portion of an electro-mechanical system for implementing contour mapping operation.

In FIG. 8 there is shown in block diagram form a portion of an electro-mechanical implementation of the present invention. Block 80 represents the sensing head shown in FIG. 1. In practice, the light source, lenses, and associated components are structurally integrated in a single unit which can be moved about as shown in FIG. 7 to track the contours of the object under measurement. In the present embodiment only the $z$ drive mechanism is shown. As mentioned hereinbelow, the $x$ and $y$ drive mechanisms can comprise drive motors with screws or other mechanical means for transmitting the motion to the sensing head 80.

In the present embodiment the $z$ motion of sensing head 80 is imparted by a mechanically coupled hydraulic or pneumatic cylinder 81. A fluid or gas pressure source 82 is coupled to cylinder 81 through an electrically controlled valve 83. Thus, by an electrical input signal to valve 83, the fluid or gas pressure to cylinder 81 is controlled, thereby controlling the motion of sensing head 80. Tracking of the contours of the object being measured is accomplished by means of a servo loop by which the error signal from sensing head 80 is coupled to a first summing point 85 together with the output signal from a "dither" generator 86 and a stepping voltage generator 87. The sum of these three signals is then coupled to an electronic controller 88 which provides the control signal to valve 83.

The function of the "dither" generator 86 is to provide a relatively low level periodic signal which is superimposed on the error signal. This results in a very small back and forth motion of the sensing head even for zero error signal position. The dithering motion thus serves to supply directional or phase information to the servo loop.

Step generator 87, on the other hand, provides step voltages which serve to maintain sensing head 80 in the general position of desired operation. That is, it prevents the sensing head-to-object distance from becoming too far out of focus. Step generator 87, in turn, is activated by the sum of the signals from a step library 89 and a linear displacement transducer 84. Linear displacement transducer 84 is mechanically coupled to cylinder 81 and thus provides an output signal which is a function of the z axis displacement of sensing head 80. In addition to serving as an input signal to the step library 89, the output of transducer 84 is also coupled to data processor 91.

The output signals from dither generator 86 and step generator 87 are also coupled to a data processing circuit 91 which yields an output which is representative of the z direction displacement. This $z+\Delta z$ signal is then coupled to a utilization means which, for example, can comprise storage means for recording $x, y, z$ contour information for later use. Alternatively, utilization means 92 can comprise the input of an automatic machine tool as indicated hereinabove.

In operation, the sensing head 80 is advantageously aligned with the z axis of the gantry as shown in FIG. 7. The $x$ and $y$ drive mechanisms are programmed to scan in the respective directions, either continuously or in incremental steps, depending upon the contour resolution desired. The $x$ and $y$ positions obtained from the $x$ and $y$ linear displacement transducers as indicated in FIG. 7 are coupled to the utilization means 92. Thus, for each $x, y$ position the sensing head is caused to maintain focal plane coincidence with the object as explained in connection with FIG. 1. The information obtained from the data processor 91 is simultaneously applied to utilization means 92. In this manner a z displacement which represents the distance to the object from the predetermined reference plane is obtained for each $x, y$ position.

In all cases it is understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:

1. A non-contacting gauge for determining the distance between a reference plane and an object comprising, in combination:
    means for generating a beam of high intensity light;
    means for splitting said beam into a plurality of secondary beams;
    means for concentrating said secondary beams on the surface of said object, the images of said secondary beams on said surface being substantially coincident when the focal point of said concentrating means and the surface of said object are coincident, and separate when said focal point and said surface are not coincident;
    means for directing the reflected light from said images to an optical detector;
    nutating means and reticle means disposed in the light path between said object and said detector, said nutating means serving to sweep the reflected image over said reticle means to produce a pulsed output signal from said detector, the harmonic content of said output signal having a null indicative of said focal plane-object coincidence.

2. The gauge according to claim 1 including servo means mechanically coupled to said beam generating means and responsive to the harmonic content of said output signal for varying the distance between said beam generating means and said object to effect said coincident condition.

3. A method for determining the distance between a reference point and an object comprising the ordered steps of:
    generating a beam of high intensity light;
    splitting said beam into a plurality of spatially separated secondary beams;
    concentrating said secondary beams on the surface of said object, the images of said secondary beams on said surface being substantially coincident when said surface is in focus, and separate when said surface is out of focus;
    nutating the reflected light beams from said images over a receiving reticle;
    directing the nutated light beams passing through said reticle to an optical detector, the output of said optical detector having a pulsed waveform;
    measuring the harmonic content of said detector output, said harmonic content having a null at said in focus condition;
    varying the distance between said light generating means and said object to produce said null; and
    observing the distance required to achieve said null.

4. A non-contacting electro-optic distance gauge comprising:
    a source of high intensity light;
    means including a beam splitter for generating a plurality of beams and for focusing said beams on a surface of an object;
    said beam splitter including a first reticle and being interposed between said source and said object in a light path;
    an optical receiver including a second reticle and light responsive means interposed in the path of the beams reflected from the object;
    a nutating plate intermediate the object and said receiver for sweeping the beams reflected from said object surface over said second reticle and said light responsive means;
    said light responsive means providing an output signal indicative of the point at which the focal plane of said focusing means and the surface of said object coincide and to indicate the distance between said source of high intensity light and said object surface.

5. The gauge according to claim 4 wherein said light source is a continuous wave laser.

6. A non-contacting distance gauge for determining the distance between a reference point and the surface of an object comprising, in combination:
    means for producing a plurality of beams of high intensity light;
    focusing means for directing said beams onto the surface of said object so as to form a single image at the focal point of said focusing means;
    receiving means adapted to provide a pulsed electrical output signal, the harmonic content of which is representative of the distance by which said object surface departs from said focal point, said receiver means including a receiving reticle; and
    nutating means for sweeping said reflected images of said beams thereacross.

7. A contour mapping device of the type having a sensing head which includes a source of high intensity light capable of being focused on an object, the contours of which are to be mapped; and optical receiving means for producing an output signal in response to the light reflected from said object; means for selectively moving said sensing head in a plane substantially perpendicular to the axis of the light beam impinging upon the surface of said object and servo means responsive to said output signal and coupled to said sensing head, said servo means adapted to move said sensing head in said axial direction to maintain the distance between said sensing head and the illuminated region of said surface constant, readout means coupled to said servo means, the output of said readout means being indicative of said axial motion; said device being characterized by beam splitting means interposed between said source and said object and means for modulating said reflected light passing to said optical receiving means, the harmonic content of said output signal having a null for the axial position of said sensing head whereat said focus occurs.

8. The contour mapping device of claim 7 wherein said light source comprises a continuous wave laser, said beam splitting means comprises a first reticle and wherein said modulating means comprises a nutating plate and a second reticle.

References Cited
UNITED STATES PATENTS 3,393,600   7/1968   Bess _____ 356—5

RONALD L. WIBERT, Primary Examiner

T. R. MOHR, Assistant Examiner

U.S. Cl. X.R.

356—5